March 2, 1965  O. G. MOODY  3,171,885
DEMAGNIFYING MIRROR
Filed Nov. 30, 1962
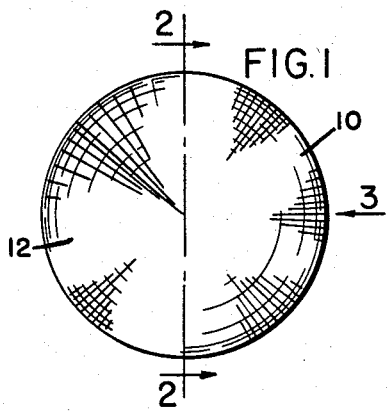
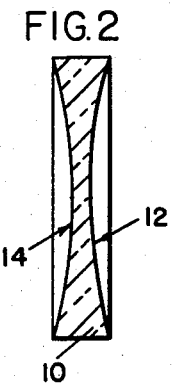
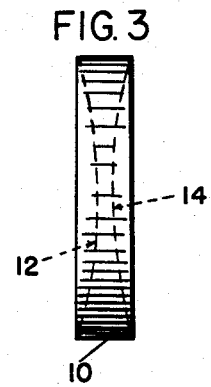
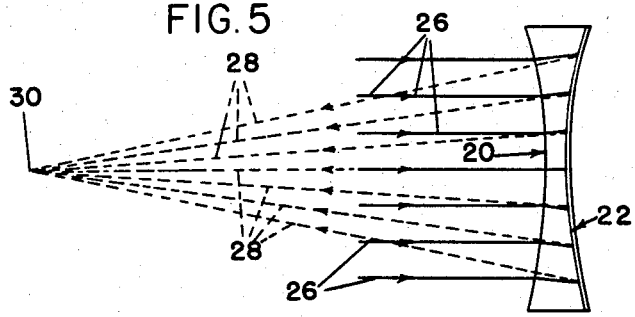
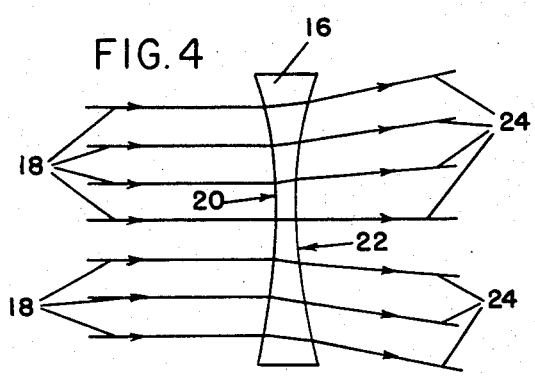
INVENTOR
O. GLENN MOODY
ATTORNEY

United States Patent Office 3,171,885
Patented Mar. 2, 1965

3,171,885
DEMAGNIFYING MIRROR
Oscar Glenn Moody, 271 Hudson St., Northboro, Mass.
Filed Nov. 30, 1962, Ser. No. 242,048
1 Claim. (Cl. 88—73)

This application is a continuation-in-part of my prior application Serial No. 7,941, dated February 10, 1960, now abandoned.

It is well known that one of the advantages of instrumentation for vision is concerned with better vision through the instrument than when the object is viewed directly. In the prior art this has always been related to or dependent on magnification. It is the principal object of the present invention however to improve vision by means of a demagnifying or reducing instrument in the form of a mirror which clarifies the image, particularly in cases of myopia, by reducing the image, such that the observer sees the image in the mirror clearly in spite of its reduction and regardless of the distance of the object from the mirror, and to the limit of the size of the image, regardless of the distance the mirror is placed relative to the eye of the observer. With the use of the new mirror, an ordinary nearsighted person who uses eyesight correcting glasses can read reversed print in the new mirror to a point of substantially 20–20 vision.

Another object of the invention resides in the provision of a reducing or demagnifying mirror comprising a lens thinner in the center than at the edges, and having two equally curved concave surfaces, one surface of which is silvered to the end that a distortion-free, demagnifying, and myopic reflector is produced which gives a clear reflection of distant objects and which has no real focal point and thus gives a reduced image.

Other objects and advantages of the invention will appear hereinafter.

Reference is to be had to the accompanying drawings, in which

FIG. 1 is a view in front elevation of a reflective mirror made according to the present invention;

FIG. 2 is a section on line 2—2 of FIG. 1;

FIG. 3 is a view in edge elevation, looking in the direction of arrow 3 in FIG. 1;

FIG. 4 is a diagram showing the passage of a light ray in the absence of any reflective surface, and FIG. 5 is a view similar to FIG. 4 but showing the effect of providing one of the surfaces of the lens of FIG. 4 with a reflective or mirror surface.

In carrying out the present invention, the same has been chosen to be illustrated in the form of a round mirror having one side thereof silvered or otherwise made reflective and the other side of course is left plain. This mirror may be made of high quality undistorted glass of any kind normally usable for the purpose. The mirror as shown in FIGS. 1, 2 and 3 may vary considerable in shape and proportion therefrom without departing from the scope of the present invention and in most cases the mirror will be made more slender than shown for instance in FIG. 2 but the showing in FIGS. 1, 2 and 3 is for purposes of clarity in the disclosure.

It will be noted that the mirror 10 in FIG. 1 is formed of a glass lens concave on both sides thereof as indicated at 12 and 14, and in which both concave surfaces are exactly equal.

Referring now to FIG. 4 there is shown a lens 16 which has the two equal concave surfaces and the line at 18 represents incident light falling on the forward surface thereof 20 which corresponds to the surface as for instance at 14 in FIG. 2. Upon passing through the surface 20, the light is refracted as shown by the lines 18 and emerges at 24 through the side 22 corresponding to side 12 in FIG. 2.

Referring now however to FIG. 5, where the surface 22 or 12 has been silvered or made reflective in any other way, the light of course cannot pass through but must be reflected from the surface which is now convex with respect to the incident light. The solid lines in FIG. 5 at 26 represent the incident light rays which are assumed to be parallel and which correspond to those at 18 in FIG. 4. These light rays pass through the forward surface at 20 exactly as before but upon being reflected from surface 22 are reflected in the direction of the propagated lines which were indicated at 24 in FIG. 4 but of course in the reverse direction, and this is shown in dotted lines at 28 in FIG. 5.

These dotted lines are seen to converge at a point 30 which is the imaginary point of focus or image point, and it will be seen therefore that the dotted lines provide for a reduced virtual image by reason of the refraction of the lines of incident light as explained above and therefore of course anything reflected by the mirror from the left-hand side thereof in FIG. 5 is reduced in size. These conditions depend at least in part in the equality of curvature of the lens surfaces.

However it is pointed out that the point 30 is actually only an imaginary point of focus. Wherever the eye is, at whatever distance it may be from surface 20, the image reflected in this mirror is clear, sharp and distinct and is undistorted throughout the entire surface of the mirror right up to the edges thereof. Furthermore, it makes no difference how far away the reflected image is, it is seen at any distance from the lens in extremely clear and sharp relationship and this is true whether the observer is myopic or not so that the mirror provides for a clear, sharp reflected image even without the use of glasses in the case of shortsighted persons. The image is sharp and clear at any point as described above for persons who do not need to wear glasses.

By varying the curvatures of the surfaces of the lens, it may be made to any prescription or a prescribed length or power, while maintaining the curvatures equal.

Having thus described my invention and the advantages thereof, I do not wish to be limited to the details herein disclosed, otherwise than as set forth in the appended claim, but what I claim is:

A demagnifying mirror comprising a generally circular single piece solid glass lens having two surfaces, said lens being concave at both surfaces thereof, the curvature of the concave surfaces being exactly equal and the lens being symmetrical from the center to the periphery at all points thereon, and reflective material on one of said lens surfaces, said reflective surface reflecting incident light providing a true reduced virtual image, said reduced image being clear and sharp at any distance therefrom, parallel lines of incident light falling on said lens being bent to travel a propagated course and the reflective light rays converging at an imaginary point of focus spaced from the lens.

References Cited by the Examiner

UNITED STATES PATENTS

| | | | |
|---|---|---|---|
| 1,869,456 | 8/32 | Bausch | 88—87 |
| 2,378,301 | 6/45 | Kaprelian | 88—57 |
| 2,582,227 | 1/52 | Brady | 88—57 |
| 2,761,354 | 9/56 | Steglich | 88—320 X |

FOREIGN PATENTS

| | | |
|---|---|---|
| 960,680 | 3/57 | Germany. |

JEWELL H. PEDERSEN, Primary Examiner.